United States Patent [19]
Yarch et al.

[11] Patent Number: 5,761,532
[45] Date of Patent: Jun. 2, 1998

[54] DIRECT MEMORY ACCESS CONTROLLER WITH INTERFACE CONFIGURED TO GENERATE WAIT STATES

[75] Inventors: Mark A. Yarch, Chandler; Byron R. Gillespie, Phoenix; Marc A. Goldschmidt, Tempe, all of Ariz.

[73] Assignee: Intel Corporation, Santa Clara, Calif.

[21] Appl. No.: 581,163

[22] Filed: Dec. 29, 1995

[51] Int. Cl.⁶ ........................................ G06F 13/28
[52] U.S. Cl. .................... 395/842; 395/848; 395/854; 395/859; 395/287; 395/292; 395/308
[58] Field of Search ........................... 395/287, 292, 395/308, 842, 848, 854, 859, 849

[56] References Cited

U.S. PATENT DOCUMENTS

| | | | |
|---|---|---|---|
| 4,989,135 | 1/1991 | Miki | 395/842 |
| 5,182,800 | 1/1993 | Farrell et al. | 395/844 |
| 5,404,522 | 4/1995 | Carmon et al. | 395/842 |
| 5,481,756 | 1/1996 | Knno | 395/842 |
| 5,548,786 | 8/1996 | Amini et al. | 395/842 |

*Primary Examiner*—Ayaz R. Sheikh
*Assistant Examiner*—Ario Etienne
*Attorney, Agent, or Firm*—Blakely, Sokoloff, Taylor & Zafman

[57] ABSTRACT

A computer system is provided including a local memory, a local bus coupled to the local memory, a peripheral bus and a direct memory access (DMA) controller. The DMA controller performs DMA transfers of data between the local bus and the peripheral bus. The DMA includes a DMA queue for storing data to be transferred and a bus ownership status circuit for determining bus ownership status of the DMA controller. The DMA controller further includes a local bus interface circuit coupled to the DMA queue and to the status circuit for halting the transfer of data from the local bus to the DMA queue without relinquishing DMA ownership over the local bus when the DMA queue is full and the status circuit indicates that the DMA controller has ownership over both the peripheral bus and the local bus.

21 Claims, 5 Drawing Sheets

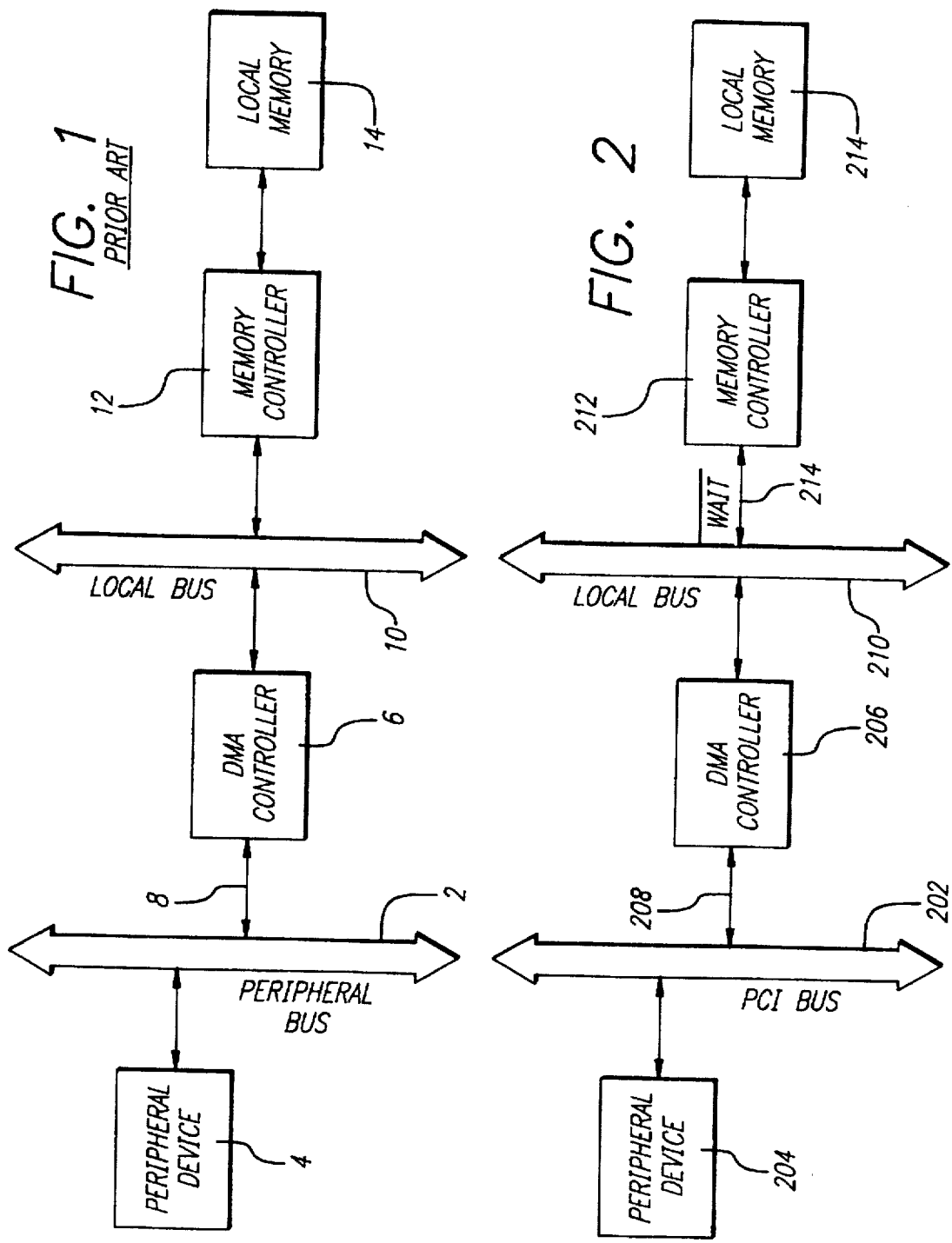

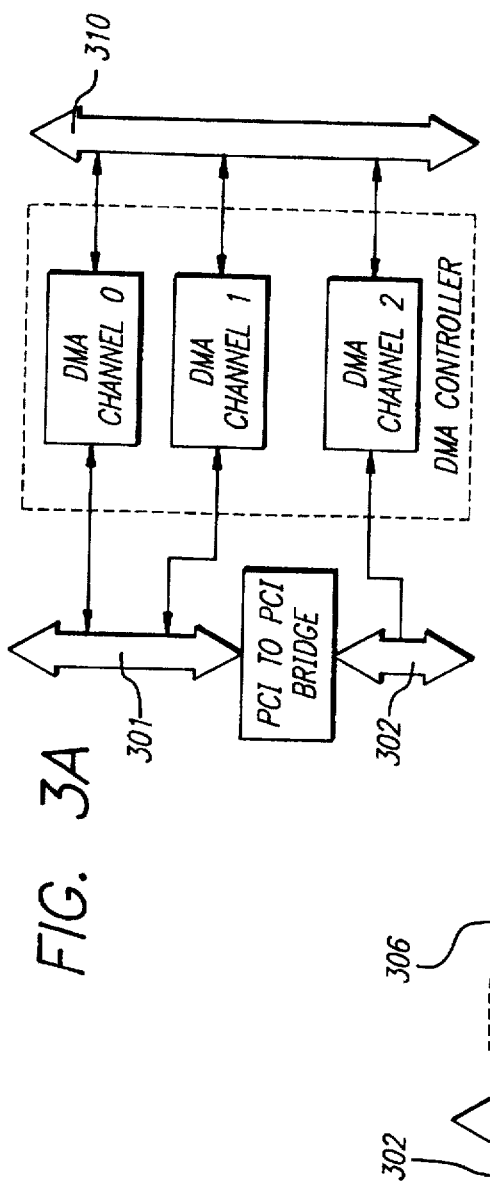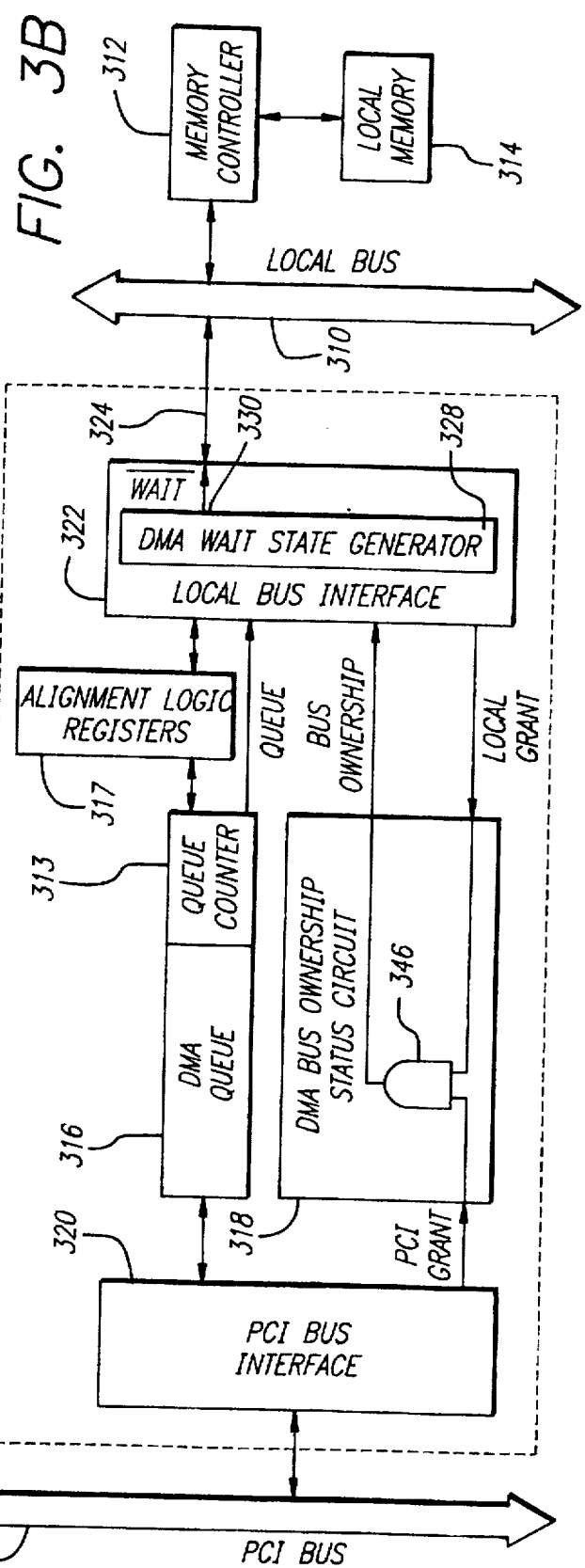

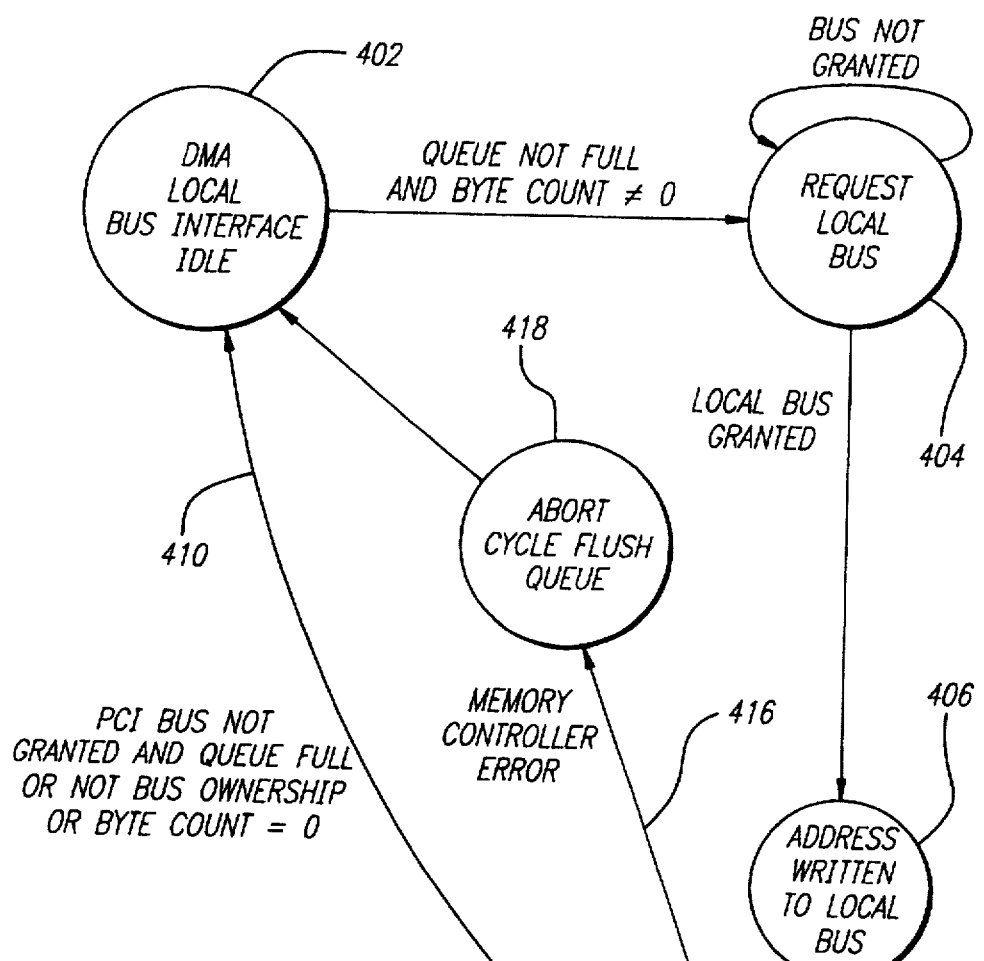
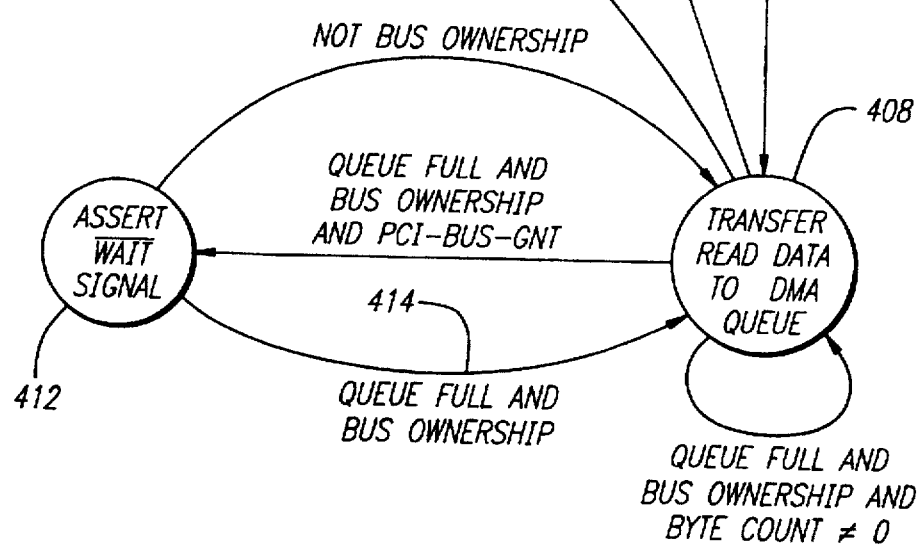
FIG. 4

DIRECT MEMORY ACCESS CONTROLLER WITH INTERFACE CONFIGURED TO GENERATE WAIT STATES

BACKGROUND OF THE INVENTION

1. Field of the Invention

The present invention pertains to the field of computer systems. More specifically, the present invention provides for a Direct Memory Access (DMA) controller performing transactions between two resources of a computer system.

2. Description of the Related Art

A Direct Memory Access (DMA) controller is an interface that provides for transfer of data directly between two computer resources such as memories and peripheral devices without the intervention of the processor. In general, the processor may initialize the DMA controller by sending address and control signals. However, the actual transfer of data is performed directly between a peripheral unit and a memory unit, for example, through the DMA controller thereby freeing the processor for other tasks.

FIG. 1 is a block diagram representation of a computer system with a DMA controller interfacing between several resources of the computer system. As one can see, a peripheral bus 2, having peripheral device 4 coupled thereto, is coupled to a DMA controller 6 via line 8. The DMA controller 6 is further coupled to a local bus 10 which is typically coupled to a processor (not shown). The local bus 10 is further coupled to a memory controller 12 which controls the exchange of information between a local memory 14 and other components of the computer system.

The DMA controller 6 is responsible for executing data transfers between the local bus 10 and the peripheral bus 2 and for providing a programming interface. Transfers from local memory 14 to the peripheral bus 2 are performed by issuing read cycles on the local bus and placing the data from the local bus into a DMA queue (not shown) of the DMA controller 6. The DMA controller reads data from the local memory 14 via the memory controller 12. Once the data, that is read from the local memory 14, starts filling the queue, the DMA controller requests the peripheral bus 2. Assuming that the peripheral bus has been granted to a DMA channel (not shown) of the DMA controller, the DMA will transfer data from the queue to the peripheral bus. At the same time, the DMA channel will continue requesting data from the local memory.

In situations where long DMA transfers need to be streamed-lined and the peripheral bus has less throughput than the local bus, (e.g., a peripheral write transfer), the DMA's channel queue will eventually become full, even if data is simultaneously transferred out of the queue onto the peripheral bus, as transfers to the peripheral bus are slower than the transfers from the local bus to the queue. In this case, if the DMA transaction continues, the data sent to the DMA channel queue may override the data existent in that queue. To avoid such a situation, the DMA controller would have to end the transfer by asserting a corresponding signal. Such action however, would have severe consequences as the DMA controller would later need to re-initiate the transfer by re-arbitrating for the local bus and recovering cycles, thus causing a significant waste of bandwidth during the address and recovery cycles. The scenario described above equally applies to DMA transfers from the peripheral bus to the local bus.

It is desirable to provide a mechanism allowing a DMA controller not to end a certain transaction in case a discrepancy in throughput arises between one bus and another bus between which the DMA controller performs transactions. It is thus desirable to halt the flow of data to the DMA queue without, however, ending the transfer in course. It is also desirable to halt incoming data flow to the DMA queue without relinquishing ownership over the bus from which data is input to the DMA controller.

SUMMARY OF THE INVENTION

The present invention provides a direct memory access (DMA) controller, for performing DMA transfers of segments of data between a first bus and a second bus. The computer system according to the present invention includes a first memory, a first bus coupled to the first memory, a second bus, and a DMA controller. The DMA controller performs DMA transfers of segments of data between the first bus and the second bus. The DMA includes a DMA queue, for storing the segments of data to be transferred. The DMA queue has a queue counter indicating a current number of segments of data stored in the queue. The DMA also includes a bus ownership status circuit for determining bus ownership status of the DMA controller. The DMA controller further includes a first bus interface circuit, coupled to the DMA queue and to the status circuit, for halting the transmission of data between the first bus and the DMA queue, without relinquishing DMA ownership over the first bus when the current number equals a predetermined value and the status circuit indicates that the DMA controller has ownership over both the first bus and the second bus.

BRIEF DESCRIPTION OF THE DRAWINGS

The features, aspects, and advantages of the present invention will become more fully apparent from the following detailed description, appended claims, and accompanying drawings in which:

FIG. 1 shows a prior art computer system performing DMA transfer of data;

FIG. 2 shows an embodiment according to the present invention including a DMA controller;

FIG. 3a is a block diagram of a DMA controller with three channels;

FIG. 3b is a more detailed block diagram of one channel of the DMA controller according to the present invention;

FIG. 4 is a state diagram of the state machine of the DMA wait state generator;

DETAILED DESCRIPTION OF THE INVENTION

Figure 5:
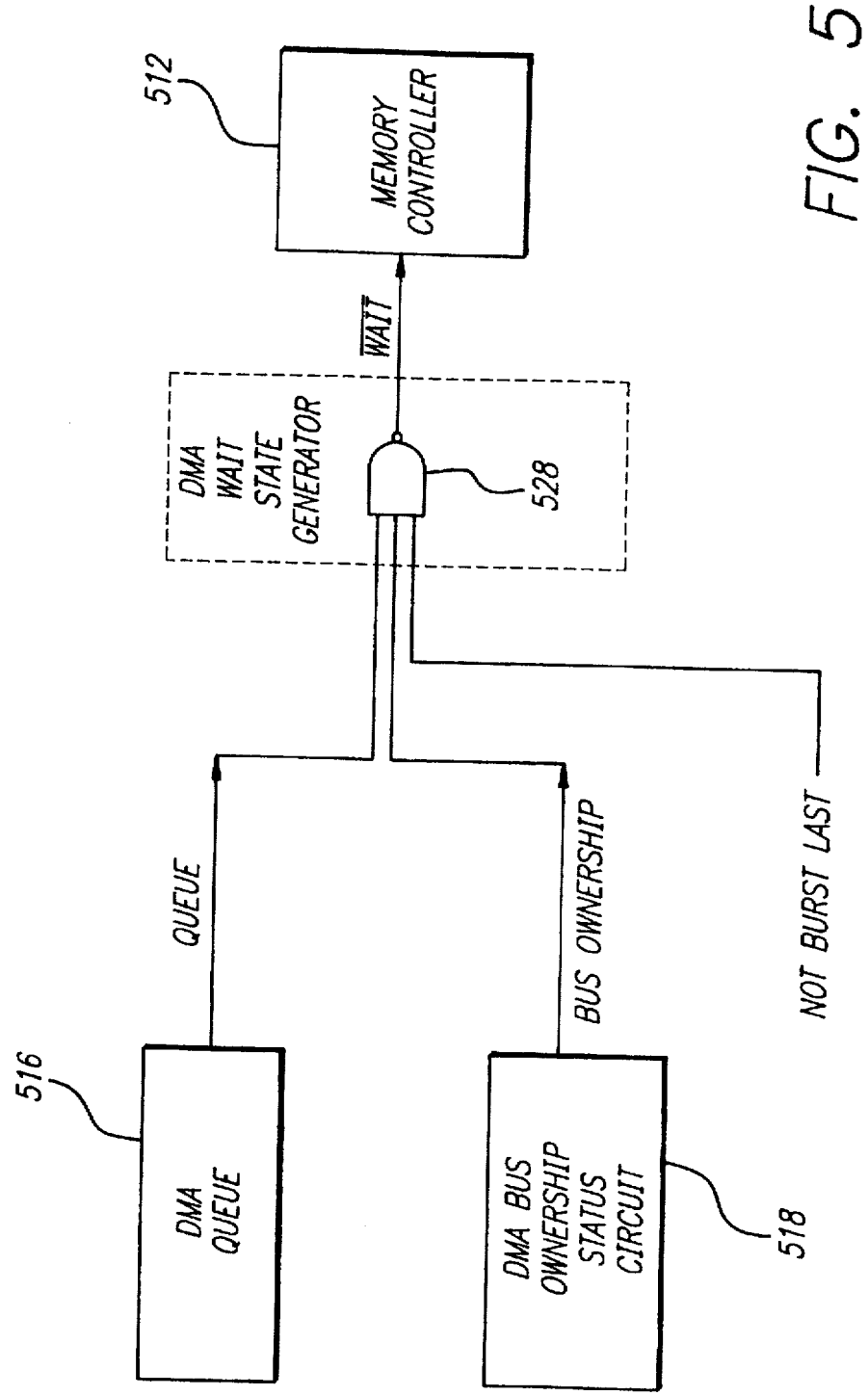
FIG. 5 is an alternative embodiment of the present invention.

In the following description, numerous specific details are set forth to provide a thorough understanding of the present invention. However, one having an ordinary skill in the art may be able to practice the invention without these specific details. In some instances, well-known circuits, structures, and techniques have not been shown in detail to not unnecessarily obscure the present invention.

FIG. 2 shows an embodiment according to the present invention including a DMA controller 206, coupled to a first bus 210 and to a second bus 202, a memory controller 212 coupled to first memory 214 and to the DMA controller 206 via a wait line 214. Hereinafter, the first bus will be referred to as local bus, and the first memory will be referred to as local memory. The second bus 202 is a peripheral bus which can be a Peripheral Component Interconnect (PCI) bus. The PCI bus is a high-speed I/O bus designed to define the interconnecting bus transfer protocol between highly-integrated peripheral adapters that are coupled to this bus. For more details regarding PCI system architecture, see PCI Local Bus Specification, Revision 2.1, of the PCI Special Interest Group of Portland, Ore. The DMA controller 206 sends a $\overline{\text{WAIT}}$ signal over the line 214 to the memory controller 212 when a number of segments of data stored in a queue of the DMA controller is equal to a predetermined value and the DMA controller has ownership over the local and the PCI bus. The $\overline{\text{WAIT}}$ signal sent to the memory controller will cause the insertion of one or more wait states in the memory controller 212 thereby halting data that the memory controller would otherwise transfer to the DMA controller's queue during a normal DMA transfer.

The queue of the DMA typically stores segments of data to be transferred between the local and the PCI bus. The queue has a queue counter indicating a current number of segments of data stored in the queue. The segments can be bytes or words. The preferred embodiment's queue stores words. In the event data is transferred from the local to the PCI bus (PCI write), the predetermined value is equal to the maximum number of words that the queue can store minus one, i.e., the queue is "almost full." In the event data is transferred from the PCI bus to the local bus (PCI read), the predetermined value is zero. Accordingly, for PCI writes, the queue can detect if it is "almost full," while for PCI reads, the queue can detect if it is empty. For the purpose of not obscuring the description that follows, "queue full" will denote a queue almost full according to the above set forth definition.

FIG. 3a shows a block diagram of a DMA controller used in the computer system according to the present invention. Channels 0 and 1 transfer blocks of data between a primary PCI bus 301 and the local memory bus 310. Channel 2 transfer blocks of data between the secondary PCI bus 302 and the local bus 310. All these channels are identical, except for channel 0, which has additional support for demand mode transfers.

FIG. 3b is a more detailed block diagrammatic representation of one channel of the DMA controller according to the present invention. Hereinafter the channel of the DMA controller will be referred to as DMA controller 306. A computer system according to the present invention includes local memory 314, coupled to a local bus 310 via memory controller 312. The computer system according to the present invention further includes a peripheral bus 302 which, in this particular embodiment, can be by way of non-limiting example a PCI bus. A direct memory access (DMA) controller 306, shown in dotted line, is coupled to the local bus 310 and to the PCI bus 302 for performing DMA transfers of data between the local bus 310 and the PCI bus 302 and vice-versa. The DMA controller 306 provides low-latency, high-throughput data transfer capability between the local bus 310 and the PCI bus 302.

The DMA controller 306 further includes a first, hereinafter "local," interface 322 coupled to the local memory 314 via the memory controller 312. The DMA controller 306 also includes a second, hereinafter "PCI," interface 320 coupled to the PCI bus 302. As explained above the PCI bus 302 can be either a primary PCI or a secondary PCI bus depending on which channel of the DMA controller 306 is used. The DMA controller 306 uses direct addressing for both the PCI bus and the local bus 310. The DMA controller 306 supports data transfers to and from a full 64-bit address range of the PCI bus 302. The PCI interface 320 supports unlimited burst lengths. The local bus interface 322 supports 2 kilobyte burst transfers. PCI bus interface and the local bus interface can be programmed from the local bus 310 through a memory-mapped register interface. Each channel can be programmed independently and has its own set of registers. The following table shows the more important internal registers in conjunction with which DMA transfers are performed.

TABLE 1

| Register | Abbreviation | Description |
| --- | --- | --- |
| Channel Control Register | CCR | Channel Control Word |
| Channel Status Register | CSR | Channel Status Word |
| Descriptor Address Register | DAR | Address of Current Chain Descriptor |
| Next Descriptor Address Register | NDAR | Address of Next Chain Descriptor |
| PCI Address Register | PADR | Lower 32-bit PCI Address of Source/Destination |
| PCI Upper Address Register | PUADR | Upper 32-bit PCI Address of Source/Destination |
| 80960 Local Address Register | LADR | 80960 Address of Source/Destination |
| Byte Count Register | BCR | Number of Bytes to transfer |
| Descriptor Control Register | DCR | Chain Descriptor Control Word |

A DMA transfer, which is a block move of data from one memory address space to another, is configured and initiated through a mapped register and one or more chain descriptors located in local memory 314. The DMA transfer is defined by a source address, destination address, number of bytes to transfer, and various control information. These values, when grouped in local memory, form a chain descriptor. A single DMA transfer is characterized by typically only one chain descriptor in the local memory. Chain descriptors can be linked together to form more complex DMA operations. The DMA controller can be programmed for a transfer from the local to the PCI bus (PCI write) or for a transfer from the PCI bus to the local bus (PCI read).

A transfer, thus, will typically start by reading a chain descriptor, corresponding to a desired transfer and loading the internal registers with values found in local memory. In a local memory to PCI bus transfer, the DMA controller will first request the local bus 310. Once the DMA controller 306 is granted access to local memory 314 and one complete word is read from local memory, the DMA controller will assert a request for the PCI bus 302. If the DMA controller acquires the PCI bus 302 while filling the queue 316, the DMA controller 306 will transfer data from the queue 316 to the PCI bus via the PCI bus interface 320. However, if the DMA queue 316 is full and the PCI bus 302 is still owned by the DMA controller 306, then the DMA controller 306 will place the local bus in a standby position, sending part of the data resident in the queue to the PCI bus.

The DMA controller, however, will have to stop the transmission of data from the local bus to the queue in order not to corrupt data, existent in the queue, which has not been transmitted. One way of halting the transmission of data from the local bus 310 to the queue 316 of the DMA controller 306 would be to simply end a current DMA transfer of data. However, as explained above such course of action would be disadvantageous for the DMA because it could waste significant bandwidth. A preferred way of halting the transmission of data from the local bus to the DMA queue, without relinquishing DMA ownership over the local bus, and thereby without ending the current DMA transfer is to have the memory controller 312 insert wait states when accessing the local memory. During a PCI read, the DMA controller will also insert wait states during the transmission of data from the queue to the local bus, if the DMA queue is empty and the PCI bus is still owned by the DMA.

The present invention, thus, provides a DMA wait state generator 328, which is coupled to the memory controller 312 via line 324. The DMA wait state generator generates wait states to the memory controller 312 thereby halting the transmission of data from the local bus to the DMA queue without relinquishing the DMA ownership over the local bus. The DMA wait state generator is coupled to the DMA queue 316 and to a DMA bus ownership status circuit 318. When the DMA queue 316 becomes full, a queue counter circuit 313 coupled to the queue 316, will generate a QUEUE signal. When asserted, the QUEUE signal indicates that the DMA queue is almost full or empty depending on whether the transfer is a PCI write or respectively a PCI read. Due to the timing requirements needed for $\overline{\text{WAIT}}$, the QUEUE signal is generated when the queue is almost full, for a PCI write, and when the queue is empty, for a PCI read. For PCI writes, "almost full" denotes the condition where two more words can be written in the DMA. One word can be written into the queue and one word can be stored in an alignment logic register 317, which is coupled to the DMA queue 316. Similarly, for PCI reads, the DMA has two more words left to be transferred when the Queue signal is asserted. Both these words reside in the alignment logic register 317.

The DMA bus ownership status circuit 318 which is coupled to both the PCI bus interface 320 and the local bus interface 322 can determine whether the DMA controller 306 has ownership over the PCI bus and the local bus. The BUS OWNERSHIP circuit is coupled to a PCI bus arbiter (not shown) and to a local bus arbiter (not shown). Typically, the DMA controller requests the PCI bus or the local bus from the respective bus arbiters. The local bus arbiter and the PCI bus arbiter assert signals LOCAL GRANT and PCI GRANT if accesses to these busses are granted. These signals indicate to the BUS OWNERSHIP the bus ownership status of the DMA. In response to these signals, the DMA bus ownership status circuit 318 generates a BUS OWNERSHIP signal to the DMA wait state generator 328. The BUS OWNERSHIP signal indicates that DMA controller 306 has ownership over both the local bus and the peripheral bus. The BUS OWNERSHIP circuit can be implemented by gating the signals LOCAL GRANT and PCI GRANT to an AND gate 346. When both the signal QUEUE and the signal BUS OWNERSHIP are set at logic high, the DMA wait state generator 328 will generate a $\overline{\text{WAIT}}$ signal to the memory controller 312. In response to the $\overline{\text{WAIT}}$ signal, the memory controller 312, which includes a memory access state machine circuit (not shown), will enter one or more wait states depending on how long the $\overline{\text{WAIT}}$ signal is asserted. The insertion of wait states in the memory controller will cause the memory controller to halt the operation it was executing before receiving the $\overline{\text{WAIT}}$ signal thereby discontinuing the transfer of data from the local bus to the DMA until the $\overline{\text{WAIT}}$ signal is deasserted.

FIG. 4 shows a state diagram of the DMA wait state generator 328 for a PCI write (i.e. for a DMA transfer from a local memory to the PCI bus). At state 402 the wait state generator checks to see if the queue of the DMA controller is not full. If the queue is not full, then the state machine goes to state 404 where the DMA channel requests the local bus. If the local bus is granted, then the state machine goes to state 406 where an address is written to the local bus. This address is typically the address of particular location in the local memory from which data is read to the DMA controller.

At state 408 the DMA controller will read data from the local memory and transfer this data to the queue. If the DMA controller acquires the PCI bus while filling the queue the DMA controller will transfer data from the queue to the PCI bus. At the same time the DMA controller will continue requesting data from the local memory. This may continue until one of the five conditions occur: 1) loss of ownership of the PCI bus; 2) loss of ownership of the local bus; 3) error condition on the PCI bus; 4) error condition on the local bus; or 5) the queue becomes full.

If the queue becomes almost full and the DMA has ownership over both the local and the PCI bus, the state machine illustrated in FIG. 4 will enter state 412 where the DMA wait state generator will assert the signal $\overline{\text{WAIT}}$ to the memory controller. Once the queue becomes not "almost full" (i.e. two or more locations in the queue become available), flow path 414 is taken to state 408 where the transfer of data continues. If an error is detected on the local bus, flow path 416 will be taken to state 418 where the DMA cycle is aborted and the queue is flushed. Similarly, when the state machine is at state 408, if the PCI bus is not granted or the DMA controller looses, at some point, ownership over the PCI bus or the local bus, then the flow path 410 is taken to state 402 and the DMA transfer is ended.

FIG. 5 shows a more detailed representation of the DMA wait state generator according to the present invention. The DMA wait state generator includes gate 528 which is a NAND gate which receives at a first input a signal QUEUE from the DMA queue 516. At a second input thereof, the NAND gate 528 receives the signal BUS OWNERSHIP from the DMA bus ownership status circuit 518 while at a third input gate 528 receives a "not burst last" signal from the local bus which indicates that a burst transaction, performed between the local and the PCI bus, has not ended. When these signals are set at logic level 1, the output of gate 528 will be set at logic level 0, and thus, the wait state generator circuit 528 will assert a $\overline{\text{WAIT}}$ signal to the memory controller 512.

Figure 6:
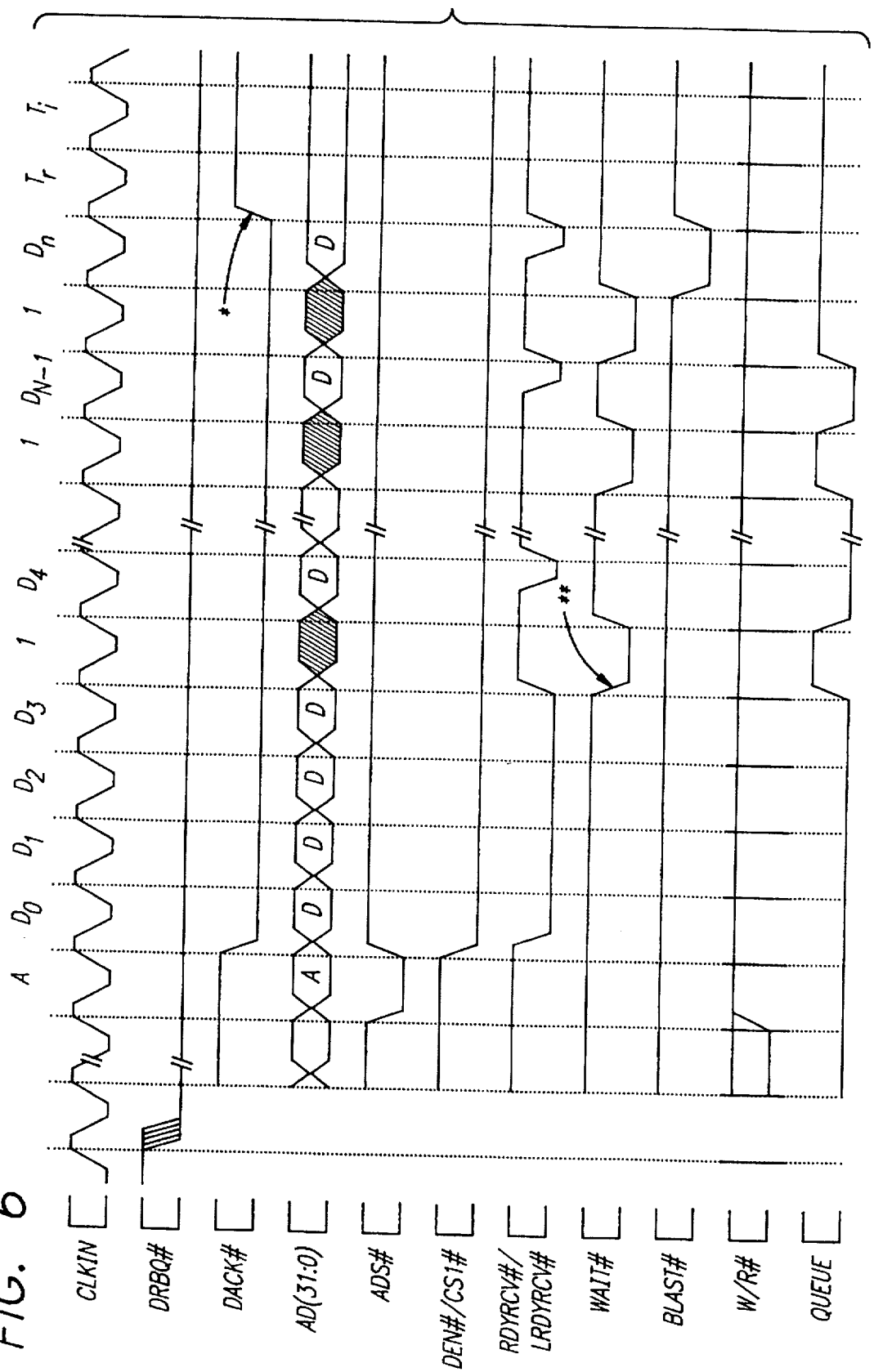
FIG. 6 is a waveform diagram of the DMA controller according to the present invention.

FIG. 6 illustrates a waveform diagram of the DMA controller according to the present invention. When the signal queue is asserted, assuming that the DMA has bus ownership over said local and PCI busses, the $\overline{\text{WAIT}}$ signal is asserted too. When the DMA loses the ownership over the PCI bus, after (AFTER) often the third wait state cycle, then the transfer will end with the burst last ($\overline{\text{BLAST}}$) signal asserted and the signal DACK deasserted. DACK is a signal driven by the DMA to a device to notify the device that the DMA has data to send to the device.

In the foregoing specification, the invention has been described with reference to specific embodiments thereof It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer system comprising:
   a first memory;
   a first bus coupled to said first memory;
   a second bus; and
   a direct memory access (DMA) controller to perform DMA transfers of segments of data between said first bus and said second bus, said DMA controller including,
   a DMA queue to store said segments of data to be transferred, said DMA queue having a queue counter to indicate a current number of segments of data stored in said queue, a bus ownership status circuit to determine bus ownership status of said DMA controller, and a first bus interface circuit, coupled to said DMA queue and to said status circuit, to halt transfer of data between said first bus and said DMA queue, without relinquishing DMA ownership over said first bus, when said current number equals a predetermined value and said status circuit indicates that said DMA controller has ownership over both said first and second busses.

2. The computer system of claim 1 wherein said DMA generates a signal QUEUE when said current number equals said predetermined value.

3. The computer system of claim 2 wherein said bus ownership status circuit generates a BUS OWNERSHIP signal indicating whether said DMA controller has ownership over both said first bus and said second bus.

4. The computer system of claim 1 wherein said first bus is a local bus, said first memory is a local memory, said second bus is a peripheral bus, and said first bus interface is a local bus interface.

5. The computer system of claim 1 further including a memory controller coupled to said local bus.

6. The computer system of claim 5 wherein said first bus interface includes a DMA wait state generator to generate a $\overline{\text{WAIT}}$ signal to said memory controller.

7. The computer system of claim 6 wherein said memory controller includes a memory access state machine circuitry to receive said $\overline{\text{WAIT}}$ signal, said memory controller being adapted to enter one or more wait states when said $\overline{\text{WAIT}}$ signal is asserted.

8. The computer system of claim 3 wherein said peripheral bus is a PCI bus.

9. The computer system of claim 8 further including a PCI bus interface coupled to said queue, to said DMA bus ownership circuit, and to said PCI bus.

10. The computer system of claim 6 wherein said DMA wait state generator comprises a NAND gate having a first input for receiving said QUEUE signal, a second input for receiving said BUS OWNERSHIP signal and an output for generating said $\overline{\text{WAIT}}$ signal.

11. The computer system of claim 6 wherein said DMA wait state generator comprises a local bus state machine circuit.

12. The computer system of claim 1 wherein said predetermined value is a value representing the maximum number of segments of data, that said queue can store, minus one, when said DMA controller performs transfers of segments of data from the first to the second bus.

13. The computer system of claim 11 wherein said predetermined value is equal with zero, when said DMA controller performs transfers of segments of data from the PC bus to the local bus.

14. The computer system of claim 1 wherein said segments of data are words.

15. A DMA controller coupled to first and second busses, said first bus being coupled to a first memory, said DMA controller configured to perform transfers of segments of data between said first bus and said second bus, said DMA controller comprising:

a DMA queue to store said segments of data, said DMA queue having a queue counter to indicate a current number of segments of data stored in said queue, a bus ownership status circuit to determine bus ownership status of said DMA controller, and a first bus interface circuit, coupled to said DMA queue and to said status circuit, to halt the transmission of data between said first bus and said DMA queue, without relinquishing DMA ownership over said first bus, when said current number equals a predetermined value and said status circuit indicates that said DMA controller has ownership over both said first and second busses.

16. The DMA controller of claim 15 wherein said DMA generates a signal QUEUE when said current number equals said predetermined value.

17. The DMA controller of claim 16 wherein said bus ownership status circuit generates a BUS OWNERSHIP signal indicating whether said DMA controller has ownership over both said first bus and said second bus.

18. The DMA controller of claim 16 wherein said first bus is a local bus, said second bus is a peripheral bus, and said first bus interface is a local bus interface.

19. A computer system comprising:

a first memory;

a first bus coupled to said first memory;

a PCI bus; and a direct memory access (DMA) controller to perform DMA transfers of data between said first bus and said second bus, said DMA controller including, a DMA queue to store said data to be transferred, a bus ownership status circuit to determine bus ownership status of said DMA controller, and a first bus interface circuit, coupled to said DMA queue and to said status circuit, to halt the transmission of data from said first bus to said DMA queue, without relinquishing DMA ownership over said first bus, when said queue is almost full and said status circuit indicates that said DMA controller has ownership over both said first and second busses.

20. A computer system comprising:

a local memory;

a local bus coupled to said first memory;

a PCI bus; and a direct memory access (DMA) controller to perform DMA transfers of data between said local bus and said PCI bus, said DMA controller including, a DMA queue to store said data to be transferred, a bus ownership status circuit to determine bus ownership status of said DMA controller, and a first bus interface circuit, coupled to said DMA queue and to said status circuit, to halt the transmission of data between said PCI bus and said DMA queue, without relinquishing DMA ownership over said local bus, when said queue is empty and said status circuit indicates that said DMA controller has ownership over both said local and PCI busses.

21. A method for performing DMA transfers of segments of data between a first bus and a second bus coupled to a DMA controller, said DMA controller having a queue, said method comprising the following steps:

determining a current number of segments of data stored in said queue of said DMA controller;

determining a bus ownership status of said DMA controller;

halting the transfer of data between said first bus and said DMA queue, without relinquishing DMA ownership over said first bus, when said current number of segments of data equals a predetermined value and said DMA controller has ownership over said first and second busses.

\* \* \* \* \*